United States Patent
Real et al.

(10) Patent No.: US 6,772,110 B2
(45) Date of Patent: Aug. 3, 2004

(54) METHOD AND SYSTEM FOR CONVERTING AND PLUGGING USER INTERFACE TERMS

(75) Inventors: Jose Luis Montero Real, Seattle, WA (US); Terry Farrell, Mount Merrion Dublin (IE); Christopher H. Pratley, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 385 days.

(21) Appl. No.: 09/894,994

(22) Filed: Jun. 28, 2001

(65) Prior Publication Data

US 2003/0004923 A1 Jan. 2, 2003

(51) Int. Cl.[7] .............................................. G06F 17/20
(52) U.S. Cl. ....................... 704/8; 704/8; 704/9; 704/1; 707/4; 707/102; 707/101; 345/705; 345/708; 345/716; 345/672
(58) Field of Search ..................... 707/1, 4, 101–102; 704/1, 8–9; 345/705, 708, 716, 672

(56) References Cited

U.S. PATENT DOCUMENTS

| | | | | |
|---|---|---|---|---|
| 5,903,859 A | * | 5/1999 | Stone et al. ................... 704/8 |
| 6,347,320 B1 | * | 2/2002 | Christensen et al. ........ 707/102 |
| 6,502,233 B1 | * | 12/2002 | Vaidyanathan et al. ..... 717/101 |
| 6,654,758 B1 | * | 11/2003 | Teague ....................... 707/101 |
| 2002/0093532 A1 | * | 7/2002 | Stana et al. ................. 345/760 |
| 2002/0143823 A1 | * | 10/2002 | Stevens ...................... 707/523 |
| 2003/0025728 A1 | * | 2/2003 | Ebbo et al. ................. 345/744 |

* cited by examiner

*Primary Examiner*—John Breene
*Assistant Examiner*—Kuen S. Lu
(74) *Attorney, Agent, or Firm*—Merchant & Gould

(57) ABSTRACT

A method and system for dynamically changing user interface terms in the help feature to the user interface language chosen by the user as opposed to the help feature language, and for converting and plugging user interface terms. A program module may allow the user to change the user interface language and the help feature language such that the user interface language may be different than the help feature language. Because the help feature often refers to user interface terms, a user may become confused if the help feature refers to user interface terms in the help language rather than in the user interface language. tagging of the HTML help feature files is altered with a special set of HTML tags so that these user interface terms may be identified and converted to the user interface language. Once a particular user interface term is identified in the HTML help feature file of the help feature language, the corresponding user interface term may be retrieved from the help feature file of the user interface language by identifying the same tag. The corresponding user interface term of the help feature file of the user interface language may then be plugged into the help feature file of the help feature language and displayed to the user.

21 Claims, 4 Drawing Sheets

METHOD AND SYSTEM FOR CONVERTING AND PLUGGING USER INTERFACE TERMS

TECHNICAL FIELD

The invention generally relates to a method and system for converting the user interface terms of a help feature of a program module into the same language as the current user interface language of the program module.

BACKGROUND

A software program module may include a help feature for providing users with guidance in performing particular functions in the program. The instructions provided to the user via a help feature often include particular steps that need to be executed to perform a particular function. These instructions may include references to particular user interface terms of the program. User interface terms are words used to describe the user interfaces (i.e., the menus, tabs, toolbars, pictures, icons and other tools) that allow a user to interact with the program. Thus, the instructions of a help feature may make reference to these user interface terms so that a user will understand which user interfaces to use to perform a particular function. For example, the instructions may advise the user to select the "File" menu (where "File" is the user interface term).

Programs often include a user interface language that defines the language in which user interfaces will be displayed to the user. These programs may also allow the user interface language to be set for the user by a system administrator. In a corporate environment, the system administrator may set the user interface language to a single language throughout the corporation so that the same user interface is presented to users throughout the corporation. Sometimes, the user is not allowed to change the user interface language setting unless he has system administration access. The user may, however, change the help feature language to a language different than the user interface language. For example, a corporate user may change the help feature language to Spanish even if the user interface language is in a different language, such as English. The help feature language defines the language in which the help feature will be displayed. Typically, a user will change the help feature language to the language with which the user is most familiar.

A difference between the user interface language and the help feature language is confusing to the user because the user interface terms referred to in the help feature do not match the user interface terms displayed by the program module (because the two languages are different). For example, the help feature may refer to the user interface term "Archivo" (if the help feature language is Spanish) while the operating system may display the user interface term as "File" (if the user interface language is English). Thus, changing the help feature language to a familiar language may make the help feature easier to understand for the user but, it may also make it difficult to understand which user interfaces to use because the user interface terms are displayed in the help feature language rather than being displayed in the user interface language.

There is a need for a method and system for ensuring that the user interface terms of a help feature and the user interface terms displayed to the user by a program module are in the same language regardless of the help feature language.

SUMMARY OF THE INVENTION

The present invention meets the above-described needs by providing a method and system for converting and plugging user interface terms. A program module may allow the user to change the user interface language and the help feature language such that the user interface language may be different than the help feature language. Because the help feature often refers to user interface terms, a user may become confused if the help feature refers to user interface terms in the help language rather than in the user interface language. In one embodiment, the invention is a mechanism for dynamically changing user interface terms in the help feature to the user interface language chosen by the user as opposed to the help feature language. In one embodiment, the tagging of the HTML help feature files is altered with a special set of HTML tags (and Attributes) so that these user interface terms may be identified and converted to the user interface language. Once a particular user interface term is identified in the HTML help feature file of the help feature language, the corresponding user interface term may be retrieved from the help feature file of the user interface language by identifying the same tag and Attributes. The corresponding user interface term of the help feature file of the user interface language may then be plugged into the help feature file of the help feature language and displayed to the user.

That the invention improves over the drawbacks of the prior art and accomplishes the advantages described above will become apparent from the following detailed description of the exemplary embodiments and the appended drawings and claims.

DETAILED DESCRIPTION OF EMBODIMENTS OF THE INVENTION

An embodiment of the present invention will be incorporated into the "OFFICE XP" suite of application program modules manufactured and distributed by Microsoft Corporation of Redmond, Wash. "OFFICE XP" program modules allow the user to change the user interface language and the help feature language such that the user interface language may be different than the help feature language. Because the help feature often refers to user interface terms, a user may become confused if the help feature refers to user interface terms in the help language rather than in the user interface language. To avoid this problem, the present invention provides a mechanism for dynamically changing user interface terms in the help feature to the user interface language chosen by the user as opposed to the help feature language.

It should be understood that in one embodiment, the "OFFICE XP" program module ships in 30 different languages. Each language adds another set of combinations (e.g., English Help with German Software, or German Help with English Software). This means there are 30 languages*29 other languages=870 supported combinations in "OFFICE XP". However, of course, there is no limit to the number of language combinations that this invention supports.

In one embodiment, the help feature is implemented in a number of HTML files with one or more help feature files for each help feature language. In this embodiment, the tagging of the HTML help feature files is altered to implement the invention. User interface terms are tagged with a special set of HTML tags (and Attributes) so that these user interface terms may be identified and converted into the user interface language if the user interface language and the help feature language are not the same. Once a particular user interface term is identified in the HTML help feature file of the help feature language, the corresponding user interface term may be retrieved from the help feature file of the user interface language by identifying the same tag (and Attributes). The corresponding user interface term of the help feature file of the user interface language may then be plugged into the help feature file of the help feature language and displayed to the user.

Exemplary Operating Environment

Figure 1:
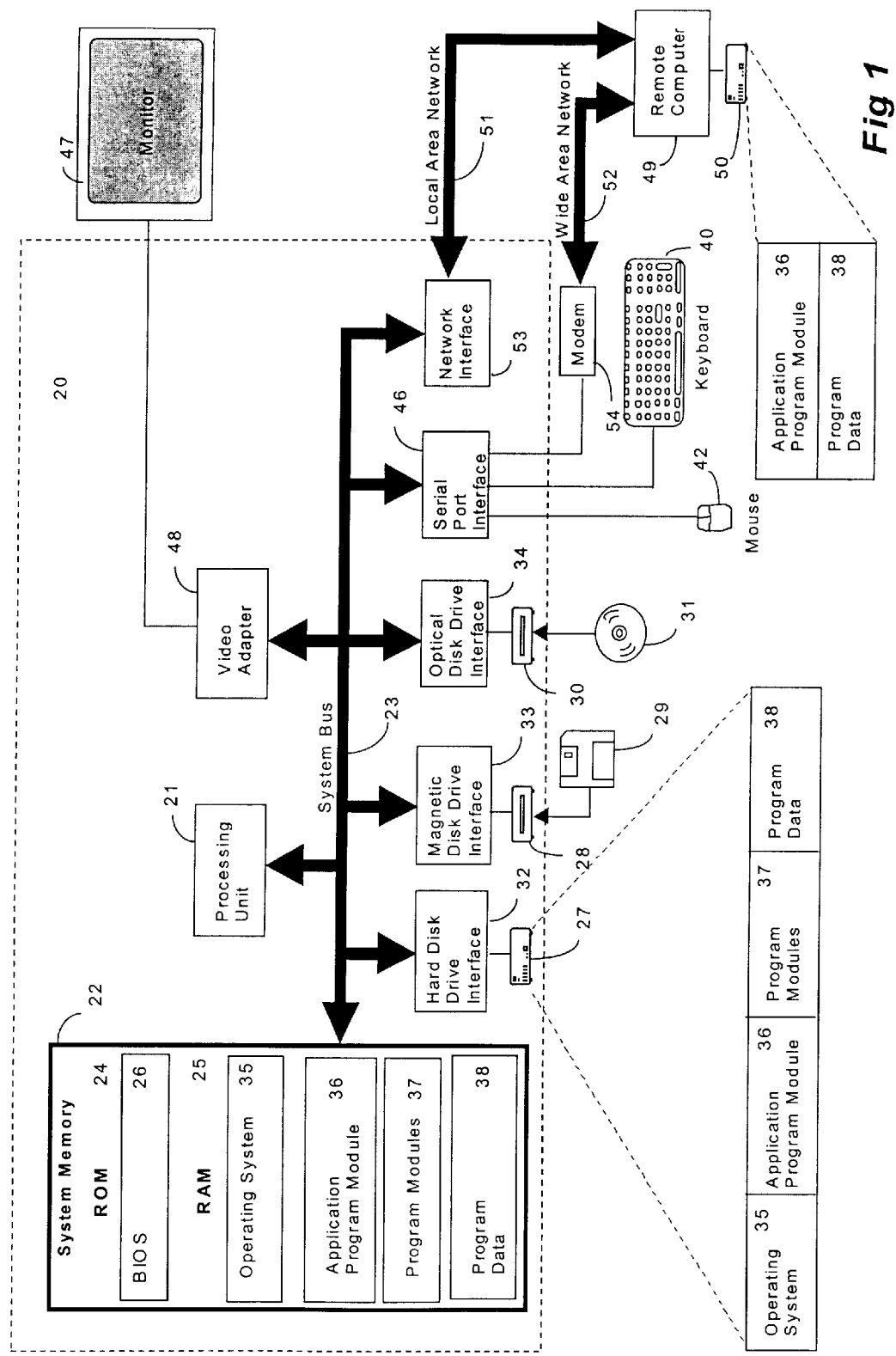
FIG. 1 is a block diagram of an exemplary system for implementing the invention.

FIG. 1 and the following discussion are intended to provide a brief, general description of a suitable computing environment in which the invention may be implemented. Although not required, the invention will be described in the context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. It should be further understood that the present invention may also be applied in the context of users accessing content on the Internet via a browser—so the present invention applies to much lower end devices that may not have many of the components described in reference to FIG. 1 (e.g., hard disks, etc.).

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during startup, is stored in ROM 24.

The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28 and optical disk drive 30 are connected to the system bus 23 by a hard disk drive interface 32, a magnetic disk drive interface 33 and an optical drive interface 34, respectively. The drives and their associated computer-readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. In a preferred embodiment, the application programs 36 comprise the "OFFICE XP" suite of program modules.

A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial port (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Class and Name Attributes to Tag User Interface Terms

It should be understood that, in a preferred embodiment of the present invention, user interface terms in help files are marked, or tagged, to distinguish them from other parts of the help files.

In a preferred embodiment of the present invention, help files for a program module are stored as Hypertext Markup Language (HTML) files. Alternatively, the help files maybe stored as XML files or in some other file format. Typically, one or more help files are stored for each help feature language supported by the program module.

Each user interface term in the help files needs to include some indication, such as a mark or a tag, to identify them so that these terms may be cross-referenced and plugged between the help files as will be further described.

In a preferred embodiment, user interface terms in help feature files are displayed in bold by the "OFFICE XP" suite of program modules. However, searching a help feature file for bold terms returns more than simply user interface terms because words that are not user interface terms may also be in bold. So, it is necessary to distinguish regular bold words from user interface terms. In a preferred embodiment, user interface terms are tagged with two attributes that distinguish them. These two attributes are referred to as class and name. For example, the HTML document displaying the user interface term "File" (as in File Menu) may look something like this:

<h1><b class=ui name=file>File</b>Menu</h1> and would be displayed as: File Menu

Thus, the two attributes to distinguish user interface terms from the rest of the help file, including other bold-faced words, are referred to as class and name.

The class attribute will be equal to "ui" in a preferred embodiment of the present invention to identify a term as a user interface term. The class attribute serves at least two useful purposes. The first is that the class attribute allows the invention to function without forcing the author of the help files to format the help files in any intrusive way. For example, user interface terms do not have to be bolded to be identified as user interface terms. Instead, all user interface terms in a help file may be located by searching for all terms with a class equal to ui. So, for example, Japanese user interface terms are not typically displayed in bold and do not have to be. A second useful purpose of the class attribute is that it indicates that an item is a pluggable user interface term. In other words, the class attribute identifies that the same user interface term in another help function file may be plugged into the help function file.

The name attribute is a lowercase version of the English user interface term with spaces removed. For example, for the user interface term "File" the name attribute is "file". Similarly, for the Spanish user interface term "Archivo" the name attribute is "file". The name attribute allows cross-referencing of user interface terms in one language with user interface terms from another language.

Tagging or marking the user interface terms of help files with the class and name attributes may be performed manually by editing the help files and tagging the user interface terms. However, manual tagging of user interface terms may be time-consuming due to the large number of help files in a typical program module. In one embodiment of the present invention, authors of help files do not need to add the name attribute and class attribute to a user interface term, because they will be automatically generated as described below. A method for automatically tagging pre-existing help files will be described below.

Automatically Tagging User Interface Terms in Help Files

A method may be used to mark the user interface terms in existing help feature files. The goal is to quickly and efficiently process large numbers of HTML help feature files and mark (tag) the user interface terms in them. In a preferred embodiment, the user interface terms in the U.S. (English) HTML help files are first marked as will be described in reference to FIG. 2. The mark-up of the English help feature files is then copied to non-English help feature files as will be described in reference to FIG. 3.

Figure 2:
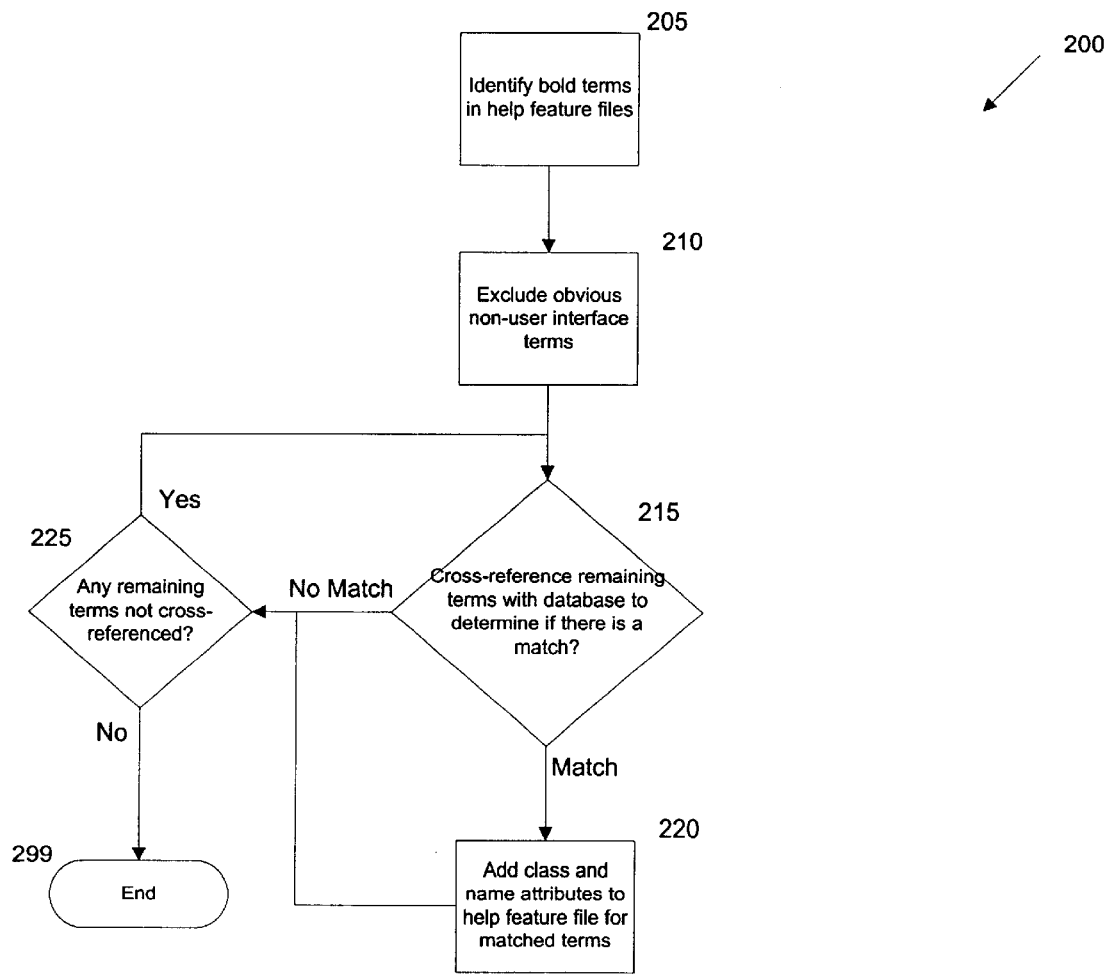
FIG. 2 is a flow diagram illustrating a method for automatically marking the user interface terms of U.S. HTML help feature files in accordance with an embodiment of the present invention.

Referring to FIG. 2, a method 200 for automatically marking the user interface terms of U.S. (English) HTML help feature files in accordance with an embodiment of the present invention will be described. At step 205, each bold term in the U.S. help feature file is identified. Typically, if the help feature file is an HTML file, then bold terms are those wrapped with <b> and </b> tags. In a preferred embodiment, existing help feature files display most, if not all, of their user interface terms in bold. The method then proceeds to step 210.

At step 210, any obvious non-user interface terms are excluded from consideration. Obvious non-user interface terms may comprise those which have a class attribute that is equal to something other than ui (e.g. in the sequence "<p class=TPT><b>Note:</b>..."). The method then proceeds to step 215.

At step 215, the identified terms are cross-referenced with a software database to determine whether there is a match. The software database is normally used to translate the software. All of the user interface terms are extracted from software files (e.g., menu and dialog resources in .EXE and .DLL) and placed into the database where they can be translated. The present invention uses the software database for another purpose: to determine whether bold terms in the help files are actually UI terms by performing a database lookup or search.

In a preferred embodiment, at least 75% fuzzy matching is used to determine if there is a match. A fuzzy match is an imperfect match. So, for example, if a search was performed searching for "File" and the database found "Files", it would be considered a positive match because "75%" fuzzy match means that at least 75% of the words/letters in the terms are required to match.

If there is a match, then the method proceeds to step 220 and the class=ui and name=xxx attributes are automatically added to the help feature file as a tag. For example, the "<b>" tag already exists, so the attributes may be added as illustrated below:

Before:

Choose <b>Open</b> from the <b>File</b> menu.

After:

Choose <b class="UI" name="open">Open</b> from the <b class="UI" name="file">File</b> menu.

If there is not a match at decision step 215, the method 200 proceeds to decision step 225 and it is determined whether there are any remaining identified terms in the help feature file that have not been cross-referenced with the software database and, if so, the method returns to decision step 215. If not, the method ends at step 299.

Performing method 200 on a help feature file is typically effective enough to mark the user interface terms of the U.S. help feature files with about 90–95% accuracy. However, some user interface terms may be missed (either because they weren't already formatted as bold or because they do not exist in the software database, i.e., they are incorrect) and somenon-user interface terms may accidentally get marked (because they closely match something that does exist in the software database).

Thus, an automatic solution is not 100% effective and requires a human review after performing method 200. Therefore, it is recommended that authors check to see if the correct UI terms have been marked in the U.S. files.

Figure 3:
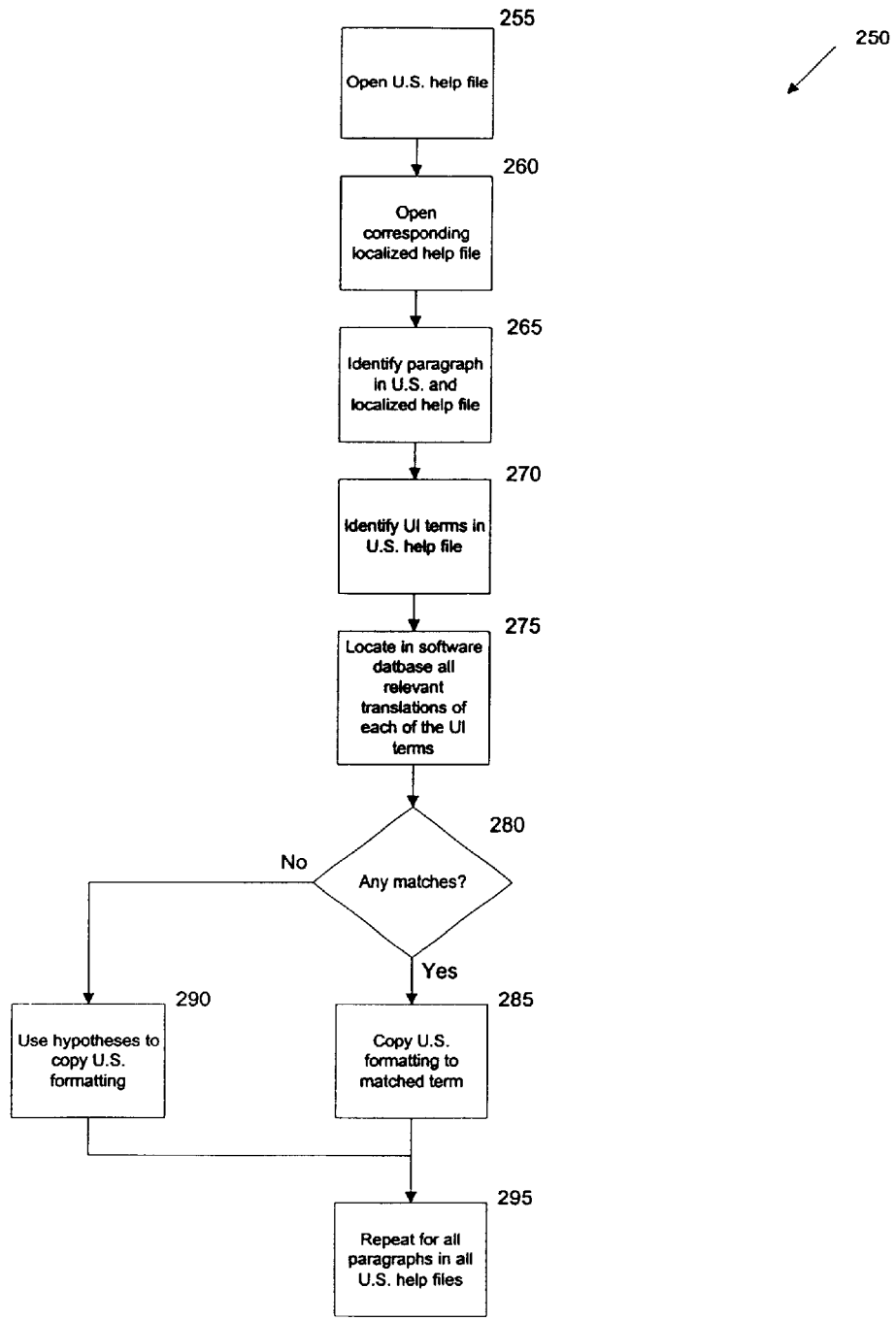
FIG. 3 is a flow diagram illustrating a method for copying the mark-up of U.S. help feature files to non-U.S. help feature files in accordance with an embodiment of the present invention.

Referring now to FIG. 3, a flowchart illustrating a method 250 for copying the mark-up of the U.S. help files to non-English help files (localized help files) in accordance with an embodiment of the present invention will be described.

It should be first noted that the mark-up can be manually added to the non-English help files and the invention will function equally well. In a preferred embodiment, the process of marking up the non-English help files has been automated to make the process more precise and to save time.

The method 250 begins at step 255 when a U.S. help file is opened. The method then proceeds to step 260 when a localized help file corresponding to the U.S. help file is opened.

At step 265, the first paragraphs in both the U.S. help file and the localized help file are identified. At step 270, the user interface terms in the U.S. help file are identified. Typically, the user interface terms are identified based on the HTML mark-up, tags and attributes of the help file.

At step 275, all relevant translations of each of the U.S. user interface terms is located in the software database. The method then proceeds to decision step 280 where it is determined whether there are any matches in the localized help file corresponding to the relevant translations found at step 275. If so, then the method proceeds to step 285 and the U.S. formatting is copied to the corresponding matched terms found in the localized help file. If not matches are found at decision step 280, the method proceeds to step 290.

At step 290, a number of hypotheses are used to copy the U.S. formatting to the localized help file. In a preferred embodiment, the following series of hypotheses is used:

Hypothesis 1: If only unmatched U.S. term and one localized term remain, assume these terms are a match.

Hypothesis 2: Make a second pass on all the files using the hypotheses of the first pass.

Hypothesis 3: Use fuzzy matching, (e.g., accept "files" and "filing" as a match for "file").

At step 295, the steps of method 250 are repeated for all U.S. help files, and all paragraphs in them.

The results of method 250 are marked up localized files ready for runtime "plugging" as will be described in reference to FIG. 4.

It should be noted that this process of marking up the non-English files has a useful by-product; i.e., it tests that the translations of the UI terms in the help match the translations of the UI terms in the software. Different people typically translate the user interface terms at different times and it's easy for the translator to make mistakes. The tool is still smart enough to plug in most cases even if there are mistakes, but the tool also generates a report detailing the obvious errors in the help files so that they can be corrected.

It should be understood that the methods 200 and 250 described in reference to FIGS. 2 and 3 are pre-processing methods performed before the help files are shipped to the client. On the other hand, the method 300 described in reference to FIG. 4 is a runtime method that is performed at runtime.

Matching User Interface Terms Using the Name Attribute

In an embodiment of the present invention, the name attribute is used to match user interface terms in a help feature file of one language with the equivalent user interface terms in a help feature file of another language. The name attribute allows a runtime scripting code to find a corresponding localized term if it is out of order and plug it into the help feature file.

The name attribute was chosen for the following reasons:

1. It is meaningful, so authors of help feature files are more likely to keep the correct name with the correct UI term.
2. It allows authors the flexibility of re-arranging a sentence, without breaking any of the international files.
3. It allows translators to reorder terms in sentences.
4. It allows authors the flexibility to re-order paragraphs within the help feature file.
5. Paragraphs can be easily moved to different help feature files by the author.
6. It allows translators to delete user interface terms (which can be necessary). For example, the U.S. text might read: Choose <b>File</b>, <b>Save</b> or choose <b>File</b>, <b>Save As</b>. However, the translator may reword this text as: Choose <b>File</b> <b>Save</b> or <b>Save As</b>. In other words, the translator has deleted an occurrence of the word "File". Similarly, a translator could also add in extra occurrences of U.S. terms (and these will still plug).

It should be understood that, in one embodiment of the invention, the author of a help feature file does not need to manually add the name attribute because methods 200 and 250 may be used to automatically add the name attribute and class attribute for a user interface term.

As described above, the name attribute allows translations and re-ordering of sentences during translations without disrupting the plugging of user interface terms between help feature files of different languages. For example, the following may be an HTML document for a help feature file in English:

<p>Choose<b class=UI name=open>Open</b>from the <b class=UI name=file>File</b>menu.</p>

<p>Then click on the <b class=UI name=tools>Tools</b>button and choose <b class=UI name=find>Find</b>from the menu. Next choose <b class=UI name=filename>File name</b>in the <b class=UI name=property>Property</b>drop down.</p>

Listed below is the correct fake translation of the sample shown above. Notice how the translator has re-ordered some of the user interface terms within the segments, which is perfectly acceptable.

<p>From a 1a <b class=UI name=file>Fillee</b>menu, choosa <b class=UI name=open>Opeena</b>.</p>

<p>Nexta choosa <b class=UI name=find>Fiinda</b>froma the <b class=UI name=tools>Toola</b> buttona meenuu. Finallee ina da <b class=UI name=property>Propertee</b> dropa downa, picka da <b class=UI name=filename>Fillee nama</b>.</p>

Note: This again shows that translators can manually add the correct mark-up, but for efficiency to the present invention automates this process.

Runtime Framework

In one embodiment of the present invention, each help feature file requires a "runtime framework" to perform the actual plugging of user interface terms from one help feature file in a first language to a second help feature file in a second language. This runtime framework includes adding a script tag to the HTML head section of each help feature file and an onload event in the body tag of each help feature file. For example the head section may appear as follows:

```
<head>
<script language=vbscript src=\fplug.js>
</head>
```
and the body section may appear as follows:
```
<body onload=plugUITerms( ) . . . >
</body>
```
This runtime framework may be added to the files with an automatic tool or may be manually added to the help feature files.

Plugging User Interface Terms

Figure 4:
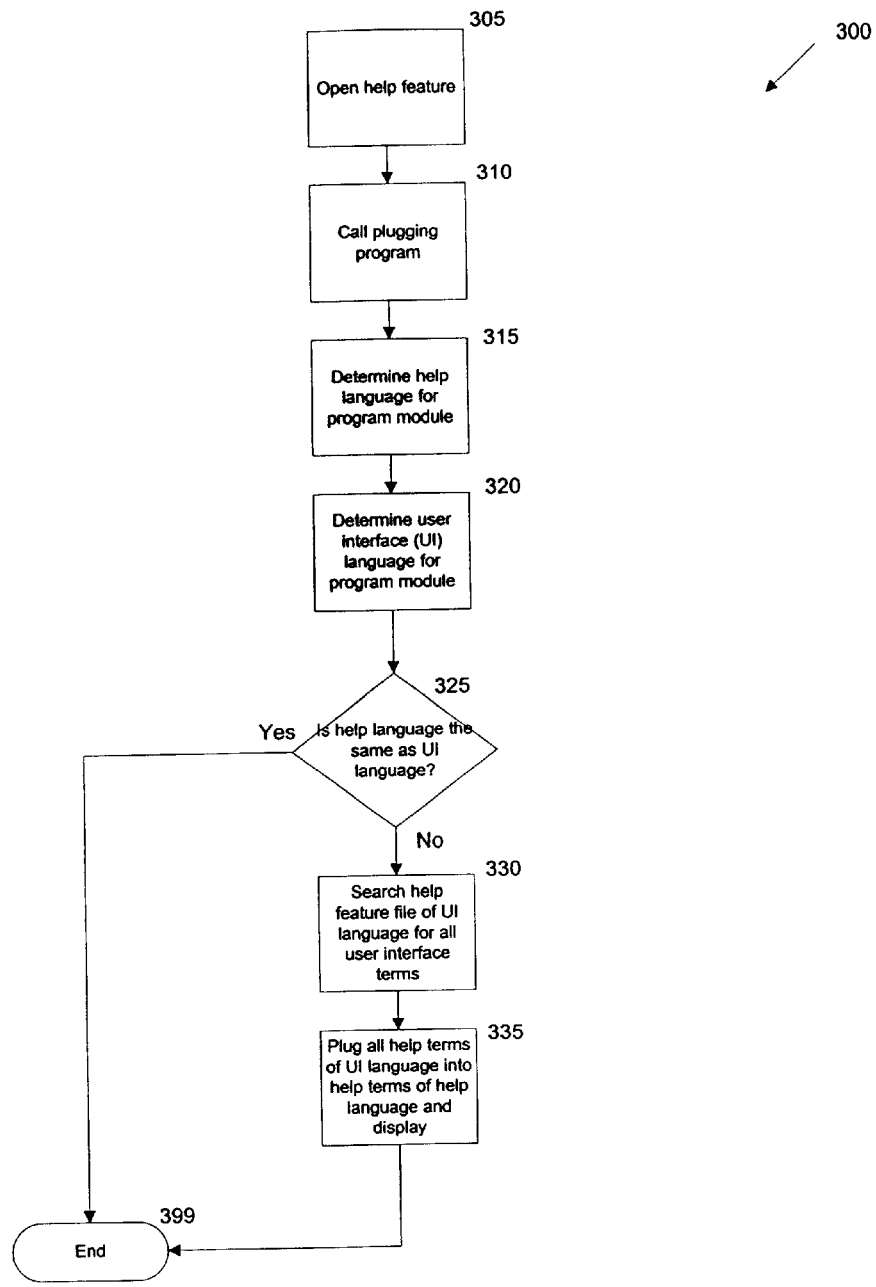
FIG. 4 is a flow diagram illustrating a method for plugging user interface terms from a user interface language help file into a help language help file in accordance with an embodiment of the present invention.

Referring now to FIG. 4, a method 300 for plugging user interface terms from a user interface language help file into a help language help file in accordance with an embodiment of the present invention will be described. The method 300 begins at step 305 when a user starts the help feature. The user may start the help feature in any way he wishes, such as from any one of the "OFFICE" applications or by running a Compiled Help (CHM) file. A CHM file contains a set of compressed HTML/css/js etc. help files. It should be understood that all of the data in the help files is in UNICODE format at the time of plugging, so there is no need to perform any codepage or character conversions.

As an example, assume that GRAPH9.CHM is the help feature file in question. Also assume the start topic is in the file "default.htm". The method proceeds to step 310 and the help feature file is loaded and calls "plugUITerms( )" when it is loaded (i.e., in the onload event). This function is part of the runtime framework. The method 300 then proceeds to step 315 where it is determined what the help language is. In a preferred embodiment, this is determined by looking at the Uniform Resource Locator (URL) that was just loaded. Of course, the current help language may be identified by a variety of methods (such as checking which folder the file was loaded from, or by checking information within the file (e.g., an attribute), or by looking for information in the registry).

At step 320, it is determined what the user interface language for the software program module is. In a preferred embodiment, the value for the user interface language for the software program module is found in the registry. But there are countless other methods that could be used to determine this.

At decision step 325, it is determined whether the user interface language matches the help feature language.

If so, then the method ends at step 399 because the user interface language and the help feature language are the same. However, if at decision step 325, it is determined that the user interface language and the help feature language do not match, then the method proceeds to step 330.

At step 330, the help feature file for the user interface language is searched for all of its user interface terms. Typically, this is done by searching for terms with a tag with class equal to ui. The method then proceeds to step 335.

At step 335, the terms found at step 335 are plugged into their equivalent terms in the help feature file of the help language and the help feature is displayed to the user. Typically, this step is accomplished using the name attribute to match terms. For example, the Spanish user interface term "Archivo" is equivalent to the English user interface term "File" because both have the same name attribute of "file". The method then ends at step 399.

With regard to steps 330 and 335, in a preferred embodiment, it's worth noting that the equivalent help file (of the UI language) is first loaded onto a hidden/invisible "frame" on the main page. From there, the scripting (tfplug.js) inside the localized file actually performs the plugging. This is important because it is used to load the HTML file (of the UI language) from which the UI terms will be extracted for plugging. In the present invention, the equivalent help file is loaded in a way that the user doesn't even notice (because it's invisible), and in a way that most web browsers support (i.e., using a frame).

Reading the UI terms directly from a HTML file removes the need to use databases. A key part of this invention is removing the need to use databases or additional files to store UI terms. Standard help files are used instead and no code (itself an added overhead) is needed to read from databases.

An example of method 300 is provided below. The following HTML is assumed for this example:

English:
```
<p>Choose<b class=UI name=open>Open</b>from the
   <b class=UI name=file>File</b>menu.</p>
```
Translation:
```
<p>From a 1a <b class=UI name=file>Fillee</b>menu,
   choosa <b class=UI name=open>Opeena</b>.</p>
```
Assume the Help language is English and the Software (UI) Language is the translated one above.

Steps:
1. Find all the help language (English) UI terms. For this implementation it is the set of terms wrapped in <b> tags that contain a class=UI attribute. ("Open" and "File").
2. Find the equivalent set in the localized file. ("Fillee" and "Opeena")
3. For each one use the name attribute to match them (Both "File" and "Fillee" have name=file so they match, the same goes for "Open" and "Opeena" which have name=open).
4. Swap in the localized text that has been found:
   ```
   <p>Choose<b class=UI name=open>Opeena</b>from
      the <b class=UI name=file>Fillee</b>menu.</p>
   ```
5. Finally, in a preferred embodiment, add a tooltip (using the Title attribute) so that the user can see what the original language version (i.e., the help language) of each plugged term was. A tooltip is a text box that floats over an item when the mouse is held over that item for a short period of time. The resulting HTML is:
   ```
   <p>Choose<b class=UI name=open title=
      "Open">Opeena</b> from the <b class=UI name=
      file title="File">Fillee</b>menu.</p>
   ```

The tooltip described above is a key part of an embodiment of the invention. It means the help displayed to the user is effectively "dual" language because the user can see each UI term (individually) in both the UI and Software language at the same time.

It should be understood that, in a preferred embodiment, the method 300 is written in Jscript and is not able to access the registry. Therefore, in this embodiment, an ActiveX control is used to access the registry.

For example, first assume that the UI language is 1025 (Arabic), and the Help language (which has just been loaded) is 1033 (English USA), and that the loaded file is called "default.htm". Because "default.htm" is inside a CHM file (graph10.chm) it's full path would be:
mk:@MSITStore:c:\program files\Microsoft office\office10\1033\graph10.chm::/htm1/default.htm:

The first task is to load the equivalent help file in the UI language. Given the Office 10 file structures this file can be found at the following location (URL):
mk:@MSITStore:c:\program files\Microsoft office\office10\1025\graph10.chm::/htm1/default.htm TFPLUG.JS will automatically add a hidden IFRAME to the page with the SRC set to this URL.

This forces the localized help topic to be loaded into the frame, but the user never gets to see it because it is loaded into a frame that is invisible If the localized help file is not available then nothing will happen. The Office XP installation features ensure that the necessary help files are available on the users system (i.e., the help for both the UI language and the help language).

Assuming the localized help file exists, the topic again calls into "plugUITerms( )" when it is loaded. However, this time TFPLUG.JS determines that the topic is loaded in a FRAME and calls a function to plug the UI terms. This uses the "name" attributes to know which order to plug in the terms (described above).

It should be understood that one of the key advantages of the present invention is that no additional files are being shipped with the "OFFICE XP" suite of program modules to store the translated user interface terms. Instead, the user interface terms in the help files are simply tagged without creating additional files to translate the terms. The translated user interface terms are retrieved directly from the localized help files. Thus, the present invention does not contribute to bloatedsoftware, i.e., software that requires unreasonable amounts of disk space or memory. However, user interface terms of the help files need to be clearly marked or tagged in certain embodiments of the present invention.

The present invention could also be used to retrieve other content (not UI terms in other languages) from a mirror CHM/HTML file. This could include additional help, additional images, terminology explanations, pointers to additional help, etc.

It should be understood that the foregoing pertains only to the preferred embodiments of the present invention, and that numerous changes may be made to the embodiments described herein without departing from the spirit and scope of the invention.

We claim:

1. A method for automatically tagging a plurality of user interface terms in a US (English) help file of an application program module, comprising the steps of:

identifying the bold terms in the help file;

excluding from the identified bold terms any non-user interface terms;

cross-referencing the remaining bold terms with a database to determine which remaining bold terms match the database; and tagging the matching remaining bold terms as user interface terms.

2. The method of claim 1 wherein the step of excluding from the identified bold terms any non-user interface terms comprises excluding bold terms which are obviously not UI terms based on formatting clues.

3. The method of claim 1 wherein the database comprises a list of possible user interface terms and the step of cross-referencing the remaining bold terms with a database to determine which remaining bold terms match the database comprises determining which of the remaining bold terms matches at least one of the terms in the list of possible user interface terms.

4. The method of claim 1 wherein the step of tagging the matching remaining bold terms as user interface terms comprises adding an HTML tag to the matching terms.

5. The method of claim 4 wherein the HTML tag comprises a name attribute specifically identifying each matching term and a class attribute identifying each matching term as one of the plurality of user interface terms.

6. The method of claim 1 further comprising the steps of:

cross-referencing the help file with a translated help file and tagging the user interface terms in the translated help file.

7. The method of claim 6 wherein the help file comprises an English help file and the translated help file comprises a non-English help file.

8. The method of claim 6 wherein the steps of cross-referencing the help file with a translated help file and tagging the user interface terms in the translated help file comprise:

opening the help file and the translated help file;

identifying user interface terms in the help file;

identifying translations of the identified user interface terms;

finding matches to the translations in the translated help file; and for each match, copying the formatting associated with the help file user interface term to the formatting of the match in the translated help file.

9. The method of claim 8 wherein the step of identifying user interface terms in the English help file comprises searching for a name attribute associated with text that identifies the text as a user interface term.

10. The method of claim 9 wherein the step of identifying translations of the identified user interface terms comprises performing a look-up in a software database of translations.

11. The method of claim 10 wherein the step of copying the formatting associated with the help file user interface term to the formatting of the match in the translated help file comprises the steps of:

locating the class and name attribute associated with the help file user interface term; and copying the class and name attribute to the match in the translated help file.

12. The method of claim 11 wherein the help file and translated help file are HTML files.

13. A method for plugging a plurality of user interface terms in a user interface language of a first help file to replace a plurality of user interface terms in a help language of a second help file, wherein both the first help file and second help file are associated with a program module on a computer, the method comprising the steps of:

determining the help language for the program module and the user interface language for the program module;

determining whether the help language for the program module and the user interface language for the program module are equivalent;

if not, then searching the first help file for the plurality of user interface terms in the user interface language; and replacing the plurality of user interface terms in the help language of the second help file with the retrieved plurality of user interface terms in the user interface language from the first help file.

14. The method of claim 13 further comprising the step of displaying the second help file with the plurality of user interface terms in the help language of the second help file replaced with the retrieved plurality of user interface terms in the user interface language from the first help file.

15. The method of claim 13 wherein the step of searching the first help file for the plurality of user interface terms in the user interface language comprises searching the first help file for instances in which an attribute stored in association with text in the first help file indicates that the text is a user interface term.

16. The method of claim 15 wherein the step of replacing the plurality of user interface terms in the help language of the second help file with the retrieved plurality of user interface terms in the user interface language from the first help file comprises locating the attribute stored in association with text in the second help file and replacing the text in the second help file with the text from the first help file.

17. A computer-readable medium comprising computer-readable instructions for performing the steps of claim 16.

18. The method of claim 16 further comprising the step of displaying a tooltip when a cursor hovers over one of the retrieved plurality of user interface terms in the user interface language from the first help file, wherein the tooltip comprises a display of the corresponding user interface term displayed in the help language of the second help file.

19. A method for cross-referencing a first plurality of user interface terms in a first help file with a second plurality of user interface terms in a second help file, comprising the steps of:

opening the first help file and the second help file;

identifying user interface terms in the first help file;

identifying translations of the identified user interface terms in the first help file;

finding matches to the translations in the second help file; and for each match, copying the formatting associated with the first help file user interface term to the formatting of the match in the second help file.

20. The method of claim 19 wherein the step of identifying user interface terms in the first help file comprises searching for a name attribute associated with text that identifies the text as a user interface term.

21. The method of claim 20 wherein the step of identifying translations of the identified user interface terms comprises performing a look-up in a software database of translations.

* * * * *